United States Patent
Okada et al.

(10) Patent No.: US 6,984,079 B2
(45) Date of Patent: Jan. 10, 2006

(54) PRINTING SYSTEM, PRINTER, DATA OUTPUT DEVICE, PRINTING METHOD

(75) Inventors: Yuji Okada, Setagaya-ku (JP); Kenji Hisatomi, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/492,047

(22) PCT Filed: Oct. 23, 2002

(86) PCT No.: PCT/JP02/11020

§ 371 (c)(1),
(2), (4) Date: Apr. 7, 2004

(87) PCT Pub. No.: WO03/036459

PCT Pub. Date: May 1, 2003

(65) Prior Publication Data

US 2004/0258444 A1 Dec. 23, 2004

(30) Foreign Application Priority Data

Oct. 24, 2001 (JP) .............................. 2001-326291

(51) Int. Cl.
*B41J 11/44* (2006.01)

(52) U.S. Cl. ......................... 400/76; 400/70; 358/1.14
(58) Field of Classification Search .................. 400/76, 400/70, 61–63; 358/1.14, 1.15
See application file for complete search history.

(56) References Cited

U.S. PATENT DOCUMENTS

| 5,477,476 A | * | 12/1995 | Schanin et al. ............. 713/324 |
| 6,509,975 B1 | * | 1/2003 | Motegi ....................... 358/1.14 |
| 2004/0021891 A1 | * | 2/2004 | Higuchi et al. ............. 358/1.14 |

FOREIGN PATENT DOCUMENTS

| EP | 0 935 184 A2 | | 8/1999 |
| EP | 0935184 A | * | 8/1999 |
| JP | 6-250804 A | | 9/1994 |
| JP | 7-195802 A | | 8/1995 |
| JP | 8-108598 A | | 4/1996 |
| JP | 8-174966 A | | 7/1996 |
| JP | 8-238822 A | | 9/1996 |
| JP | 08328681 A | * | 12/1996 |
| JP | 10-230665 A | | 9/1998 |
| JP | 11-263054 A | | 9/1999 |
| JP | 2000-020179 A | | 1/2000 |
| JP | 2000172474 A | * | 6/2000 |
| JP | 2000-289215 A | | 10/2000 |
| JP | 2001109603 A | * | 4/2001 |
| JP | 2001-223997 A | | 8/2001 |
| JP | 2001223997 A | * | 8/2001 |

* cited by examiner

*Primary Examiner*—Minh Chau
(74) *Attorney, Agent, or Firm*—McDermott Will & Emery LLP

(57) ABSTRACT

A printing system that simply links the process for turning OFF the power to a printing apparatus and a data-output apparatus such as a STB. The data-output apparatus sends an instruction to the printing apparatus to turn the power OFF, and turns the power OFF after the printing process by the data-output apparatus ends. The printing apparatus receives an instruction, and turns the power OFF after the printing process by the printing apparatus ends.

26 Claims, 15 Drawing Sheets

FIG. 7

| MANAGEMENT NUMBER (JOBID) | PRINTING OBJECT | NUMBER OF PRINTING PAGES | COLOR |
|---|---|---|---|
| J1 | image1.bml | 1 | BLACK AND WHITE |
| J2 | image2.bml | 1 | FULL COLOR |

FIG. 13

| RESERVED SHUT-DOWN | ●YES  ONO |

PRINTING SYSTEM, PRINTER, DATA OUTPUT DEVICE, PRINTING METHOD

TECHNICAL FIELD

This invention relates to link between the printer and devices connected to the printer (for example a television set-top box; hereafter referred to as STB) when turning the power OFF.

BACKGROUND ART

Normally, when a plurality of devices are connected to a network according to the IEEE1394 standard, in order to link those devices when turning the power OFF, the devices or the main device constantly monitors the operating status of the system, and when it is confirmed that each device can be turned OFF, the power to the devices is turned OFF. For example, as shown in FIG. 1, when device A and device B are connected to a network according to the IEEE1394 standard, in order to link the devices when turning the power OFF, device A checks the operating status of the system of device B at set intervals, and when it is confirmed that device B can be turned OFF, the power to device A and device B is turned OFF.

However, in this conventional method, in order to link turning the power OFF, device A must constantly monitor device B, and so there was a problem in that the burden on device A was large, and the processing to link device A and device B became complicated. Here, a STB 1 is taken to be device A and a printer 2 is taken to be device B, and even when the power link when the STB 1 is connected to this printer 2 is taken into consideration, there same complicated processing is necessary.

DISCLOSURE OF THE INVENTION

In a printing system comprising a printing apparatus and a data-output apparatus that outputs the data to be printed to the printing apparatus, the object of the present invention is to more simply perform the link between the printing apparatus and the data-output apparatus when turning the power OFF.

In order to accomplish the object of the invention, for example in a system comprising a STB 1 and printer 2, when the STB 1 sends a power-OFF instruction to the printer 2, and according to this instruction, the printer 2 performs a process for turning the power OFF that is separate from the process of the STB 1. It is possible to determine that the power to the STB 1 can be turned OFF at the instant when the STB 1 determines that there is no printing data, and it is possible to determine that the power to the printer 2 can be turned OFF at the instant when it is confirmed that the paper has been output.

In this case, for the STB 1 determining whether or not it is possible to turn the power OFF is possible according to whether or not there is any printing data (data ready for printing) in the STB 1, and for the printer 2 it is possible according to whether or not the paper has been output, so it is possible to link the power-OFF process between the STB 1 and printer 2 without having to use a complicated linking process between the STB 1 and printer 2 for turning the power OFF.

BRIEF DESCRIPTION OF THE DRAWINGS

FIG. 7 is a drawing showing the JOB management data for the printer 2.

FIG. 13 is a drawing showing a graph of the reserved shutdown in the first and second embodiments of the invention.

BEST MODE FOR CARRYING OUT THE INVENTION

Figure 1:
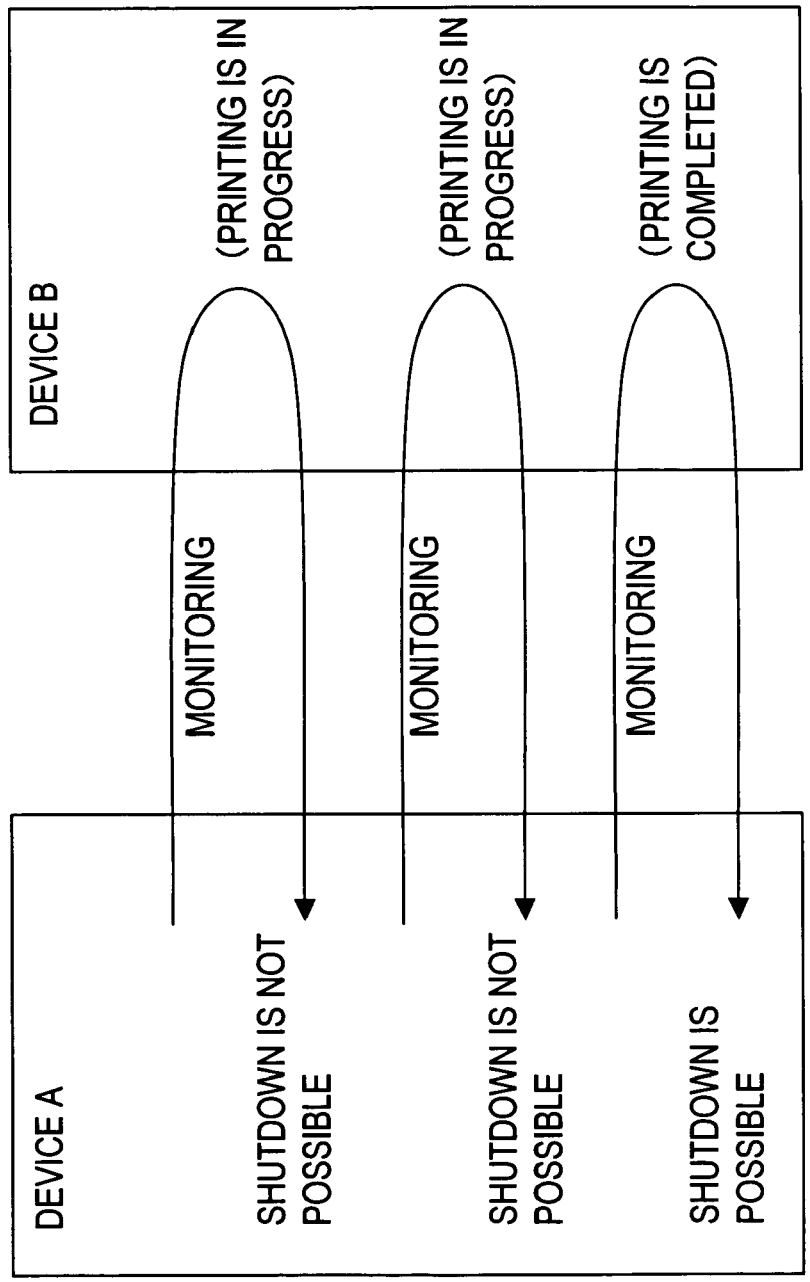
FIG. 1 is a drawing showing the power link in the prior art.
Figure 2:
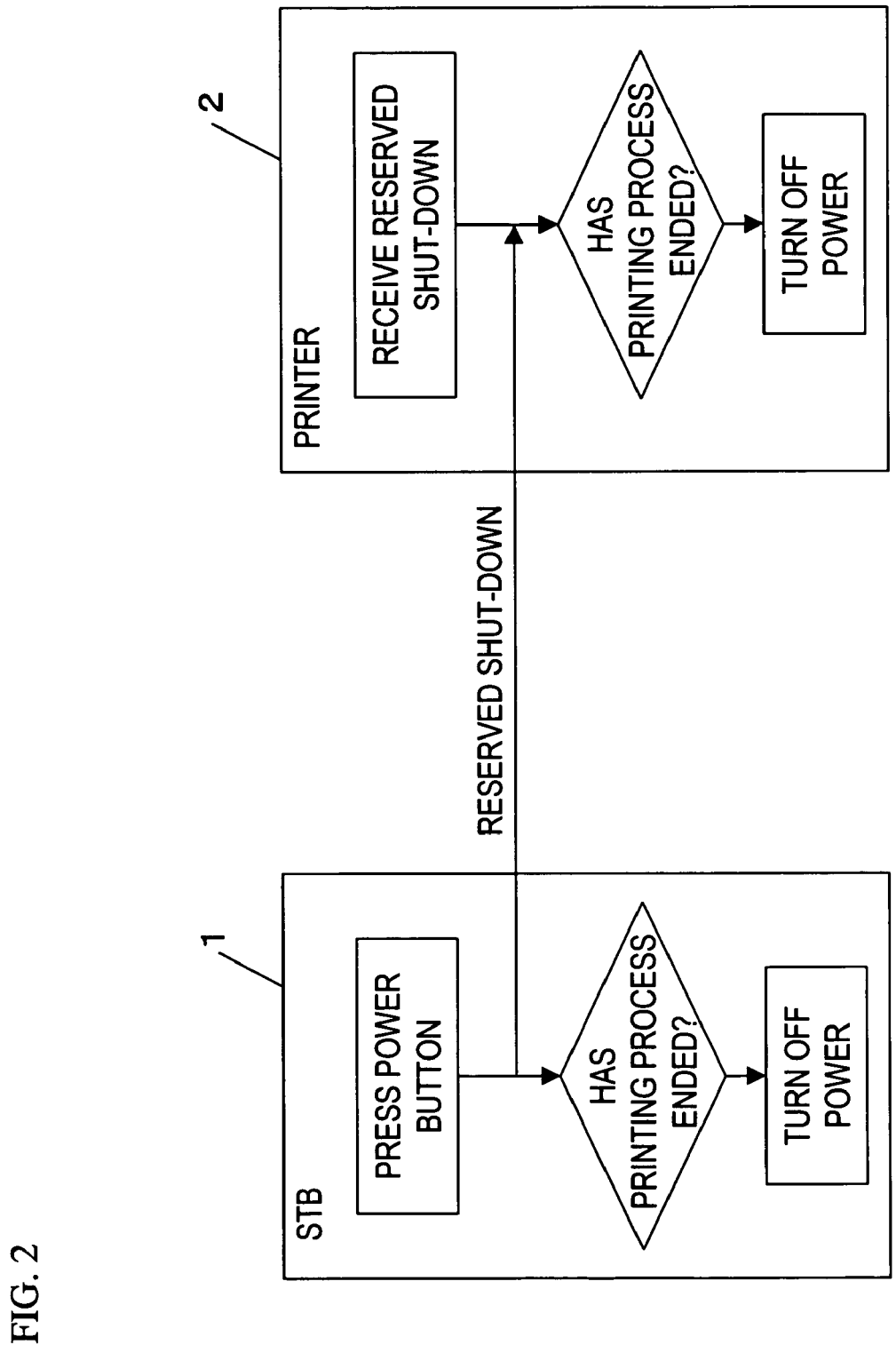
FIG. 2 is a drawing showing the reserved shutdown timing in the link relationship between the STB 1 and printer 2 in a first embodiment of the invention.
Figure 3:
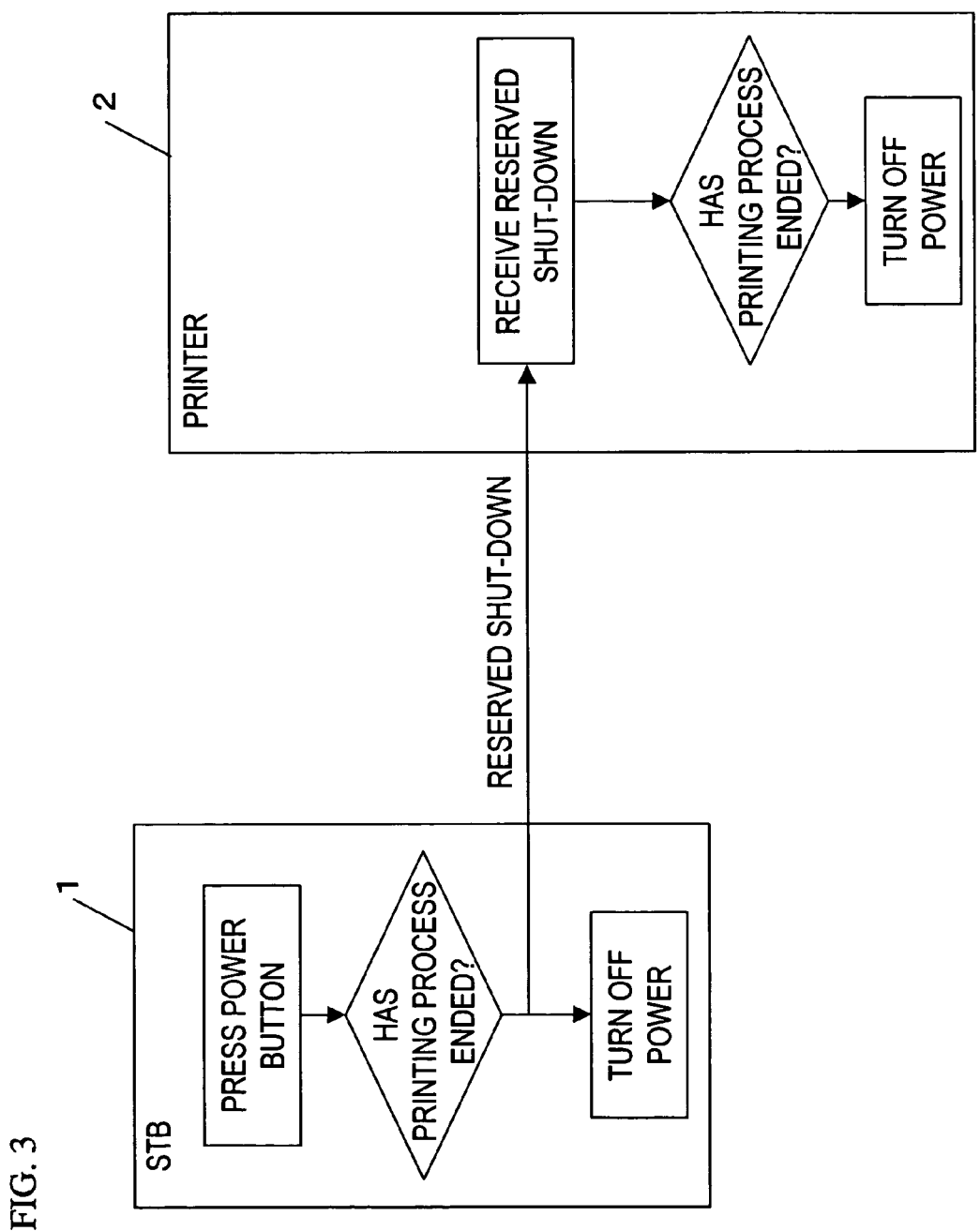
FIG. 3 is a drawing showing the reserved shutdown timing in the link relationship between the STB 1 and printer 2 in a second embodiment of the invention.
Figure 8:
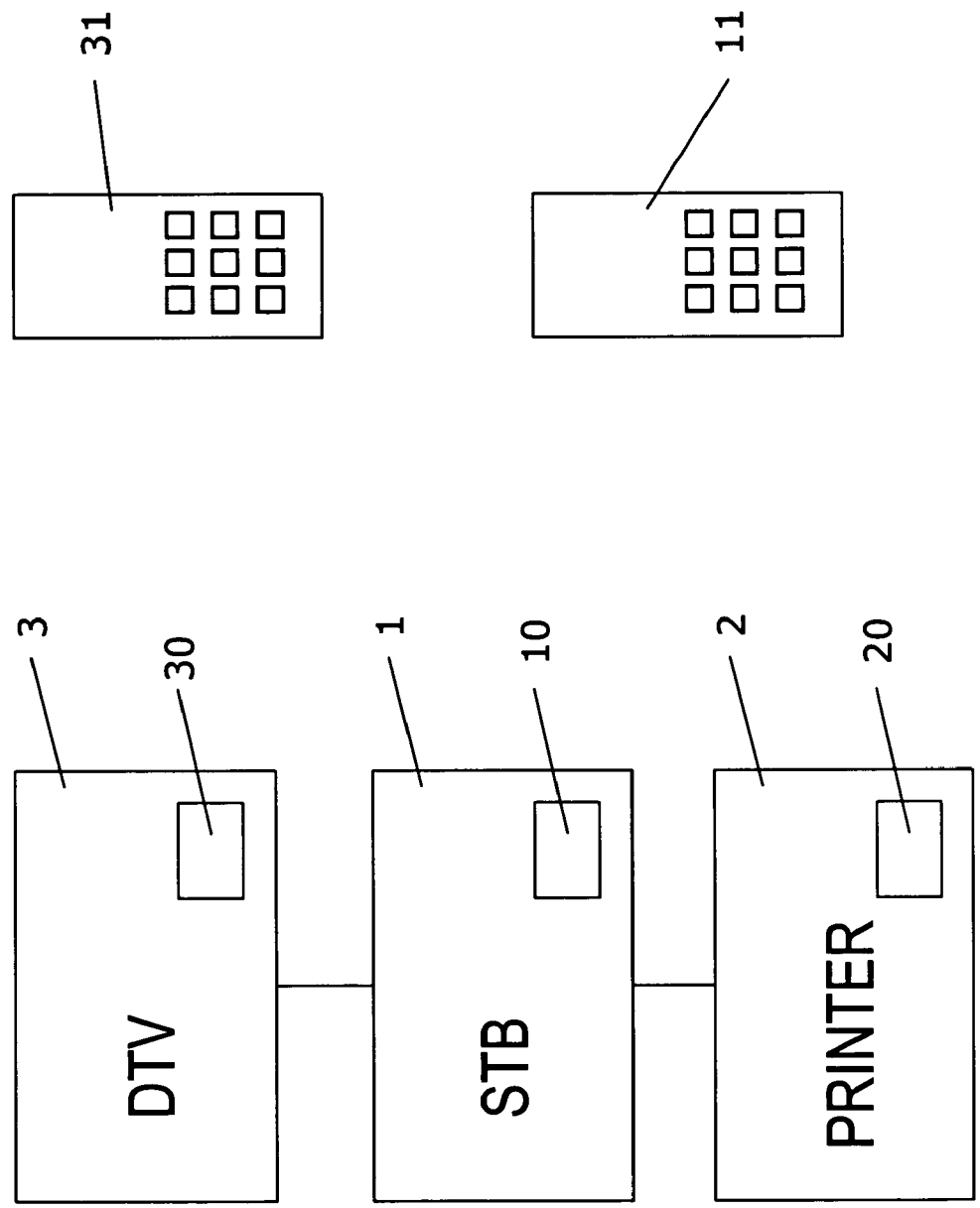
FIG. 8 is a drawing showing the relationship between a digital television 3, STB 1 and printer 2 used in the first and second embodiments of the invention.

As shown in FIG. 8, the printer 2 is connected to the STB 1 that is connected to the digital television 3, and the printer 2, digital television 3 and STB 1 each have their own power button 20, 30, 10. In order for the user watching the digital television 3 to turn the power to each device OFF, uses the control buttons on the remote controls 31, 11 for the digital television 3 and STB 1, or presses the respective power buttons 30, 10. In a printing system that comprises a STB 1 and printer 2, turning the power OFF to the printer 2 is linked to turning the power OFF to the STB 1. As methods for linking turning the power OFF between the printer 2 and STB 1, there is a method of an instruction being sent from the STB 1 to the printer to turn the power OFF at the instant when the user presses the power button 10 of the STB 1 and the power to the printer 2 that is connected to the STB 1 is to be turned OFF (noted as reserved shut-off below) as shown in FIG. 2, and as shown in FIG. 3, there is a method in which a reserved shut-down is performed from the STB 1 to the printer 2 at the instant when the printing process by the STB 1 finishes after the power button 10 of the STB 1 is pressed and the power to the printer 2 connected to the STB 1 is to be turned OFF. It is possible to use a pull-print type printer or push-print type printer for the printer 2. Here, pull-printing is a printing method where during the printing process by the printer, when data becomes necessary, the printer 2 fetches data from the STB 1, and the printing process is completed, as compared to a push-printing where after the printing data has all been received by the printer, the printer performs the printing process locally.

(First Embodiment)

Figure 4:
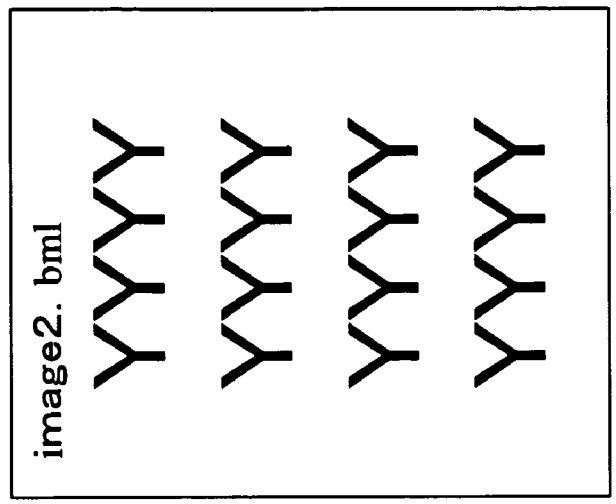
FIG. 4 is a drawing showing the data to be printed in the first and second embodiments of the invention.
Figure 4:
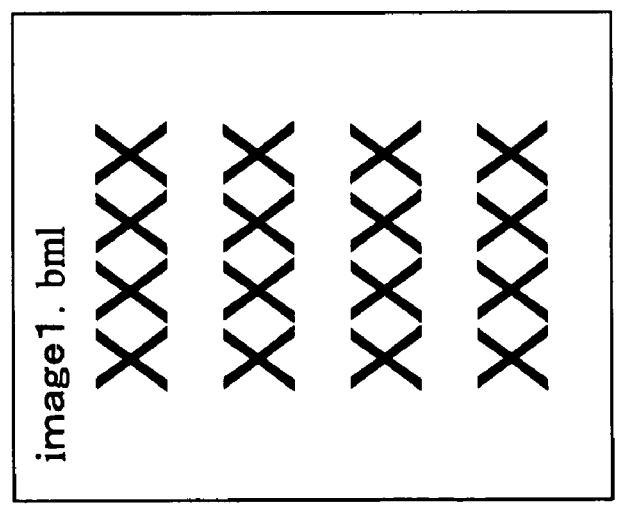

First, as shown in FIG. 2, the case of a reserved shutdown of the printer 2 as soon as the user presses the power button 10 will be described. The data to be printed are the two images, 'image1.bml' and 'image2.bml', shown in FIG. 4, and they are printed in the order, 'image1.bml' and 'image2.bml'. The images 'image1.bml' and 'image2.bml' are files in page-description language for data transmission. As shown in FIG. 4, the images can be text, or can be images and symbols.

Figure 10:
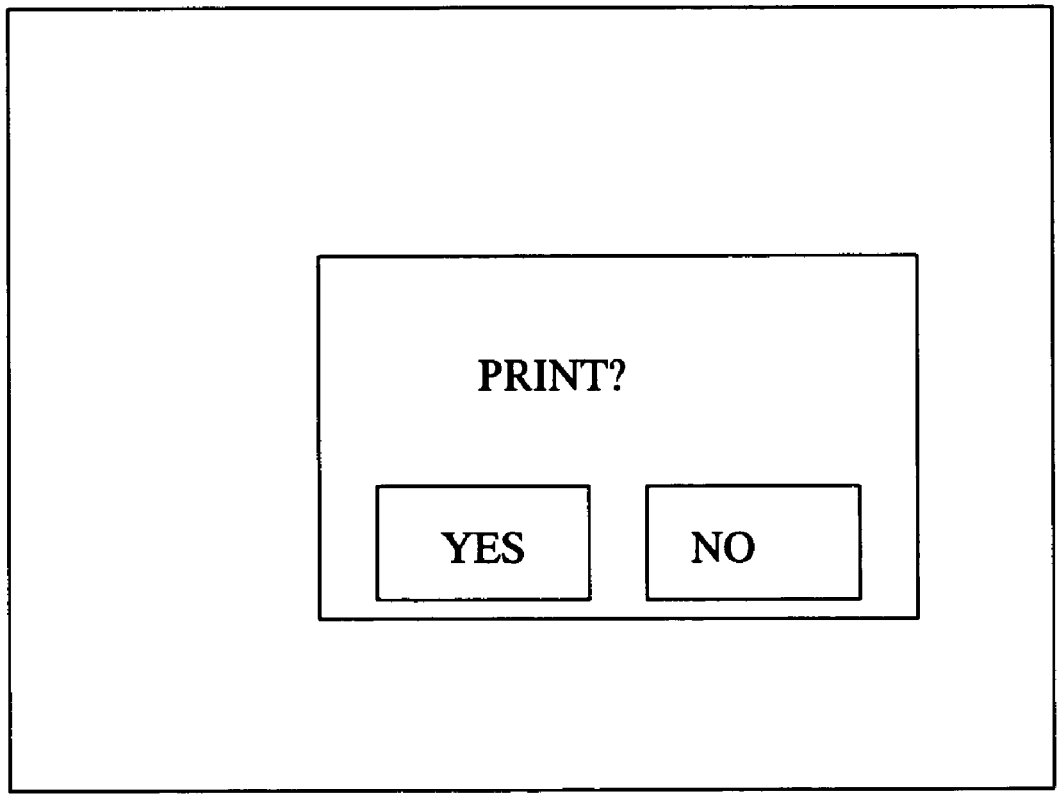
FIG. 10 is a drawing showing the printing-instruction screen that is displayed on the screen of the digital television 3.

The user sends an instruction to start printing using the print-instruction screen on the screen of the digital television 3 shown in FIG. 10. The print instruction that is input from the remote-control receiver 35 of the digital television 3 is sent to the printer 2 by ways of the STB 1, and the printing process starts. The printer 2 performs the printing process for 'image1.bml', and then performs the printing process for 'image2.bml'. The print instruction could also be input from the remote-control receiver 15 of the STB 1. Also, it is possible to input the print instruction from the printing-instruction receiver 25 of the printer 2 using the remote control for the printer 2. In the case of push printing, the data for 'image1.bml' and 'image2.bml' is collectively stored in the memory 24 of the printer 2, and in the case of pull printing, the data is stored every printing. In the case of pull printing, when the power to the STB 1 is turned OFF before the printer 2 acquires all of the data to be printed, it is not possible to print the remaining data, so the link between the STB 1 and printer 2 for turning the power OFF becomes even more important. Therefore, the case of pull printing will be explained below.

Figure 9:
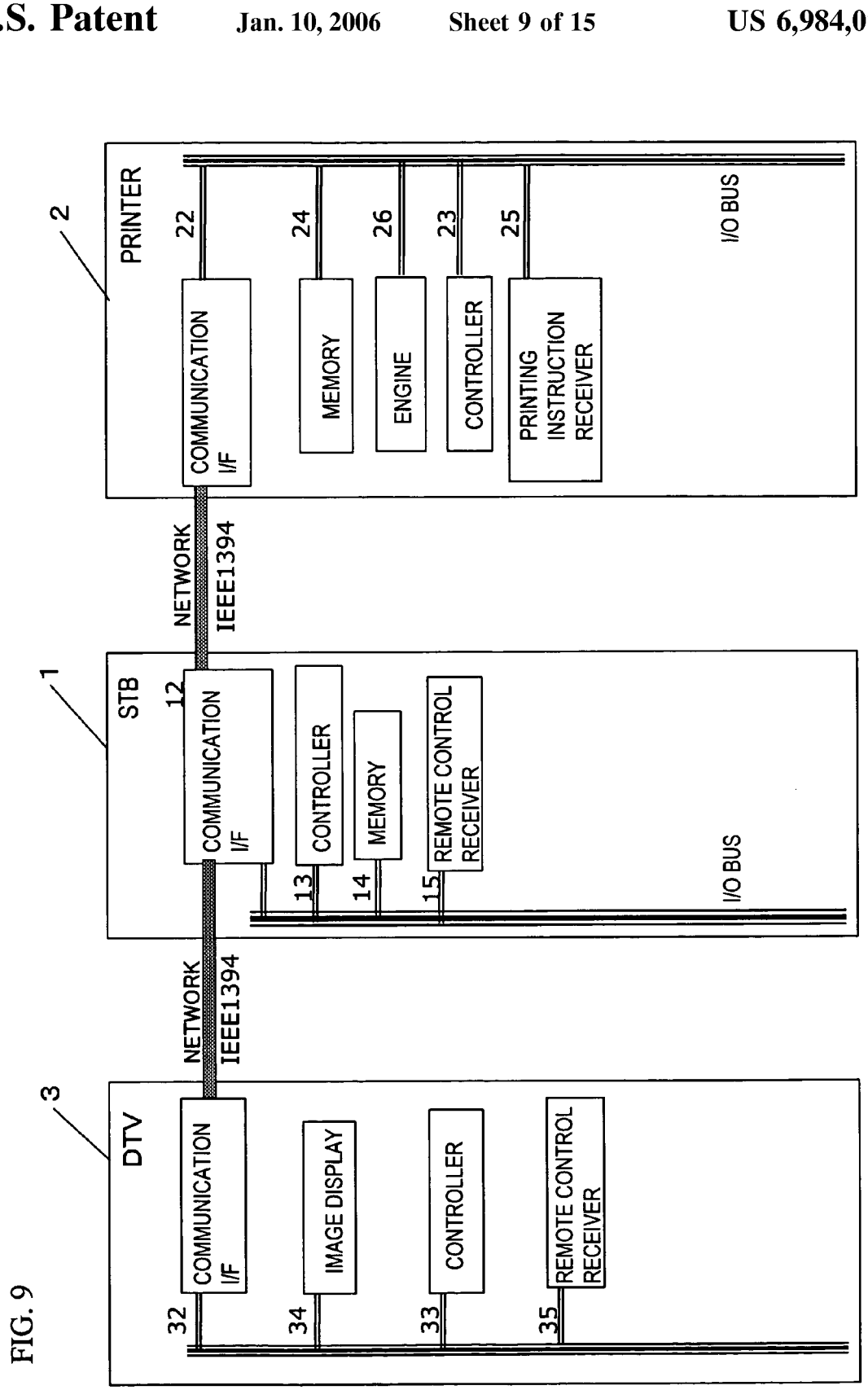
FIG. 9 is a drawing showing the construction of the digital television 3, STB 1 and printer 2 used in the first and second embodiments of the invention.

As shown in FIG. 9, the digital television 3 comprises a communication interface 32, a screen-display 34, controller 33, and remote-control receiver 35. The printer 2 comprises a communication interface 22 for connecting to the STB1, a memory 24, engine 26, controller 23, and print-instruction receiver 25. The STB 1 comprises a communication interface 12 for connecting to the digital television 3 and printer 2, a memory 14, controller 13 and remote-control receiver 15. In the example shown in FIG. 9, an internal memory 14 inside the STB 1 is used as the memory for the STB 1, however, instead of that, it is also possible to use another memory such as an external memory apparatus. The STB 1 stores received data in the memory 14. After the two images shown in FIG. 4 are received by the STB 1, they are stored in the memory 14. As a broadcast program ends and the data to be printed, 'image1.bml' or 'image2.bml', is deleted from the memory 14 of the STB 1, it is not possible to continue printing, so the STV 1 has a HDD, and the data in the memory 14 to be printed, 'image1.bml' or 'image2.bml' is saved on the HDD, and printing can be performed using the data saved on the HDD. Also, the data sent from the STB 1 to the printer 2 to be printed can be data after 'image1.bml' or 'image2.bml' has been converted by the STB 1, or can be data that hasn't been converted yet. In the explanation below, the data to be printed is not converted by the STB 1, but is sent to the printer 2 without being converted.

Below, the case where the power to the STB 1 is turned OFF while the printer 2 is in the progress of the printing process for 'image1.bml' will be explained. In this case, if the power to the STB 1 were to be turned OFF immediately when the power button 10 of the STB 1 was pressed, and even though the data 'image1.bml' that is being printed is stored in the memory 24 of the printer 2, since processing is pull printing, the data 'image2.bml' for which the printing process has not been performed remains only in the memory 14 of the STB 1 and is not stored in the memory 24 of the printer 2, so printing by the printer 2 cannot be completed. In order to complete the printing by the printer 2, the power to the STB 1 is turned OFF at the instant when the printing process by the STB 1 is completed. On the other hand, assuming that printing is completed when the printer 2 finishes printing and the paper is completely output, it is possible for the user to obtain the printed matter with no problem. The method for determining the end of printing will be described later.

Figure 11:
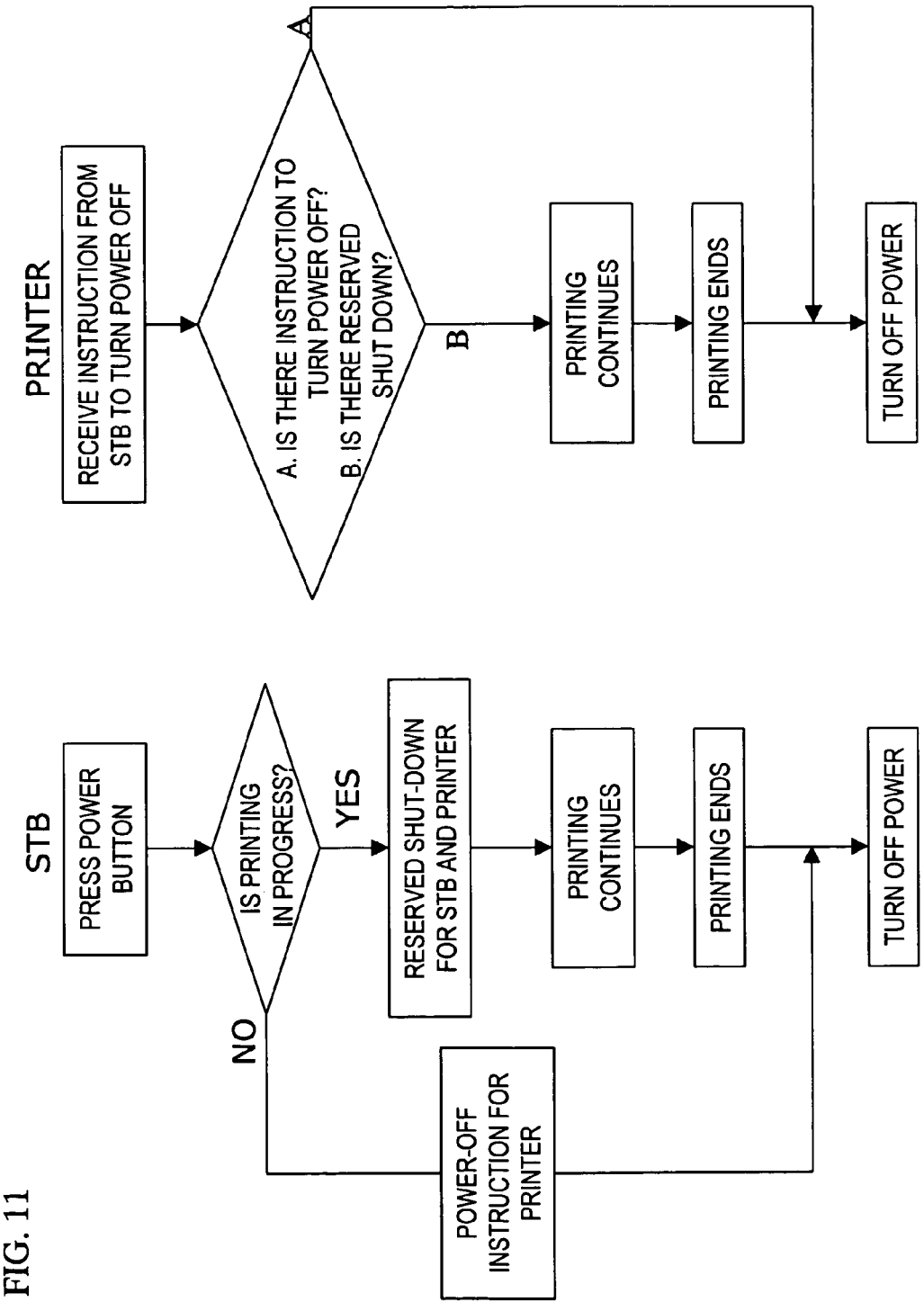
FIG. 11 is a drawing showing the flow of the respective processing of the STB 1 and printer in the first embodiment of the invention.
Figure 13:
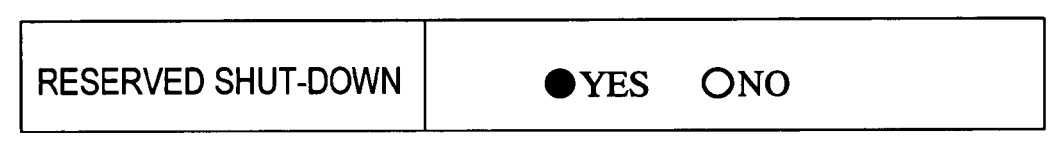

Furthermore, FIG. 11 will be used to describe in detail the processing of the STB 1 and printer 2. By having the controller 13 of the STB 1 determine whether or not the printing process by the STB 1 is complete before turning the power OFF to the STB 1 right away after the power button 10 of the STB 1 is pressed, when the printing process is finished, the power is turned OFF, however when the printing process is not finished, the reserved shut-down process is performed for the STB 1 and printer 2. The reserved shutdown process for the printer 2 is performed according to an instruction to the printer 2 by way of the communication interface 12 of the STB 1. A process of setting end flags, as shown in FIG. 13, by the controllers 13, 23 of the STB 1 and printer 2 is performed. The end flags are stored in the respective memories 14, 24. On the other hand, since the printing process of the STB 1 is still remaining, the current printing process continues. When the printing process ends, since there is an end flag, the STB 1 turns OFF its own power. For the printer 2, by inputting an instruction from the STB 1 related to turning the power OFF, or in other words, by inputting an instruction for reserved shut-down of the printer 2 when the printing process by the STB 1 is not finished, the process for turning OFF the power to the printer begins.

When there is only 'image1.bml' to be printed, since the printing process by the STB 1 is finished, by inputting an instruction allowing power-OFF of the printer 2, the process for turning OFF the power to the printer 2 begins. Each instruction is stored as a flag in the respective memory 14, 24 the same as for the end flags shown in FIG. 13. When the input instruction is an instruction allowing end of the printer 2, the power to the printer is turned OFF, and when the input instruction is a reserved shut-down instruction, processing of the printing is finished and the completion of the printing by printer 2 is confirmed, and after confirming the flag, the printer 2 turns OFF its own power.

Furthermore, even though the input instruction is an instruction allowing printing, it is possible to perform the power-OFF processing after checking whether there is remaining printing processing to be performed by the printer 2, without performing the power-OFF processing immediately.

There are two possible methods for performing the judgment at the instant when the printing process by the STB 1 is completely finished.

Figure 5:
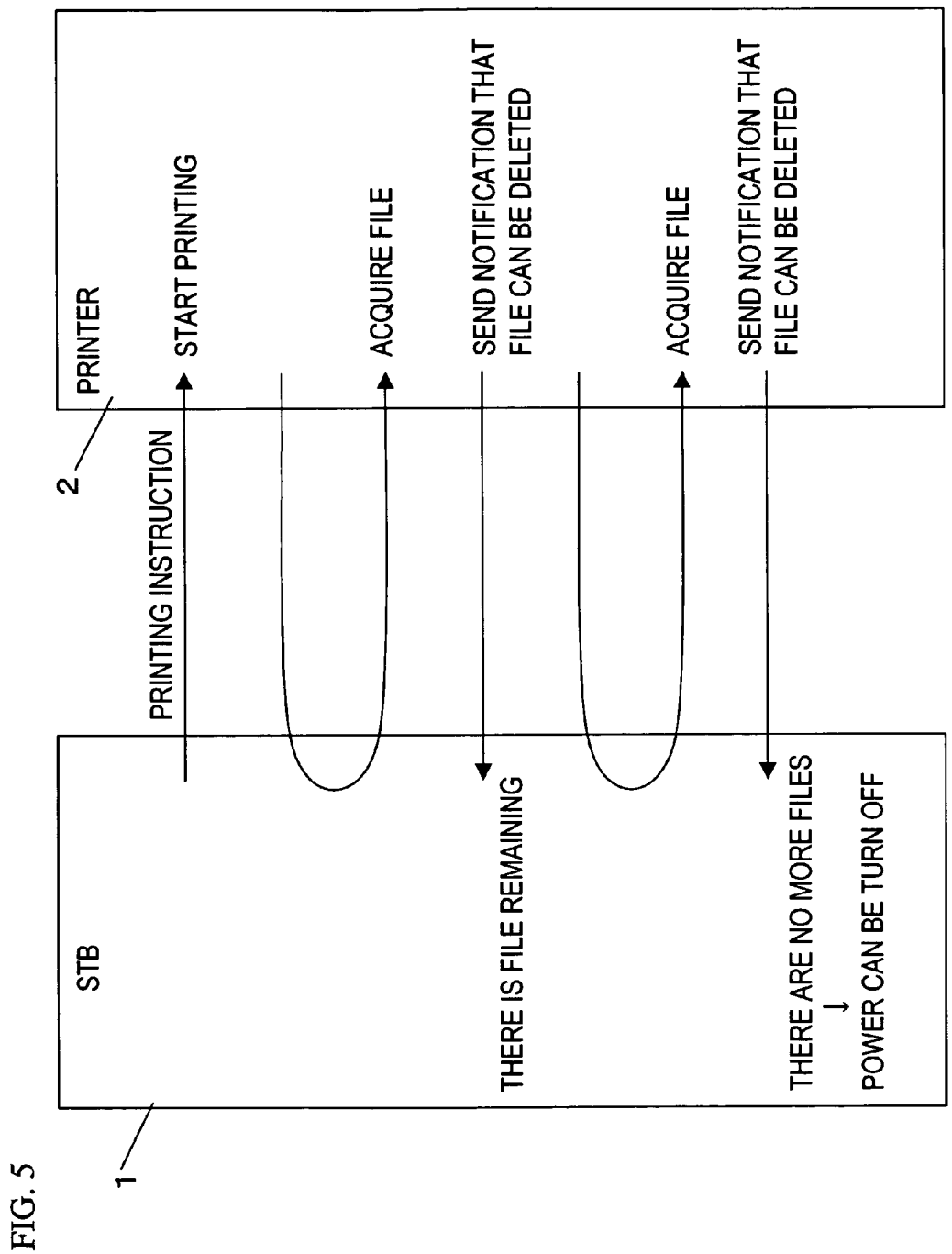
FIG. 5 is a drawing showing the flow of a first process for determining the end of the printing process for the STB 1.

First, FIG. 5 shows a first method. When printing the data shown in FIG. 4, suppose the case when 'image1.bml' is already stored in the memory 24 of the printer 2, 'image1.bml' and 'image2.bml' are stored in the memory 14 of the STB1, and the printer 2 is to print 'image1.bml' and 'image2.bml'. The contents to be processed by printer 2 can be obtained from the JOB management information shown in FIG. 7 for example. At the instant that the printing process for 'image1.bml' is finished, an instruction is output from the printer 2 to the STB 1 indicating that 'image1.bml' in the memory 14 of the STB 1 can be deleted. The STB 1 receives this instruction and deletes 'image1.bml' from the memory 12 of the STB 1. At this time, 'image2.bml' remains in the memory 14 of STB 1. Next, the printer 2 requires 'image2.bml', and processing goes from the printer 2 to the STB 1 to acquire 'image2.bml'. Similar to 'image1.bml', when the printing process for 'image2.bml' is finished, an instruction is output from the printer 2 to the STB 1 indicating that 'image2.bml' in the memory 14 of the STB 1 can be deleted. The STB 1 receives this instruction and deletes 'image2.bml' from the memory 14 of the STB 1. After this, there is no more data to be printed in the memory 14 of the STB 1, and since there is no more processing for the printer 2, so the instant when all of the printing data is deleted from the memory 14 of this STB 1 is regarded as the end of the printing process, and it can be determined that preparation for turning the power OFF is complete. The printing data described above can be data used for display on the screen of the digital television 3, or can be the data of the same contents saved separately from that used for printing.

Figure 6:
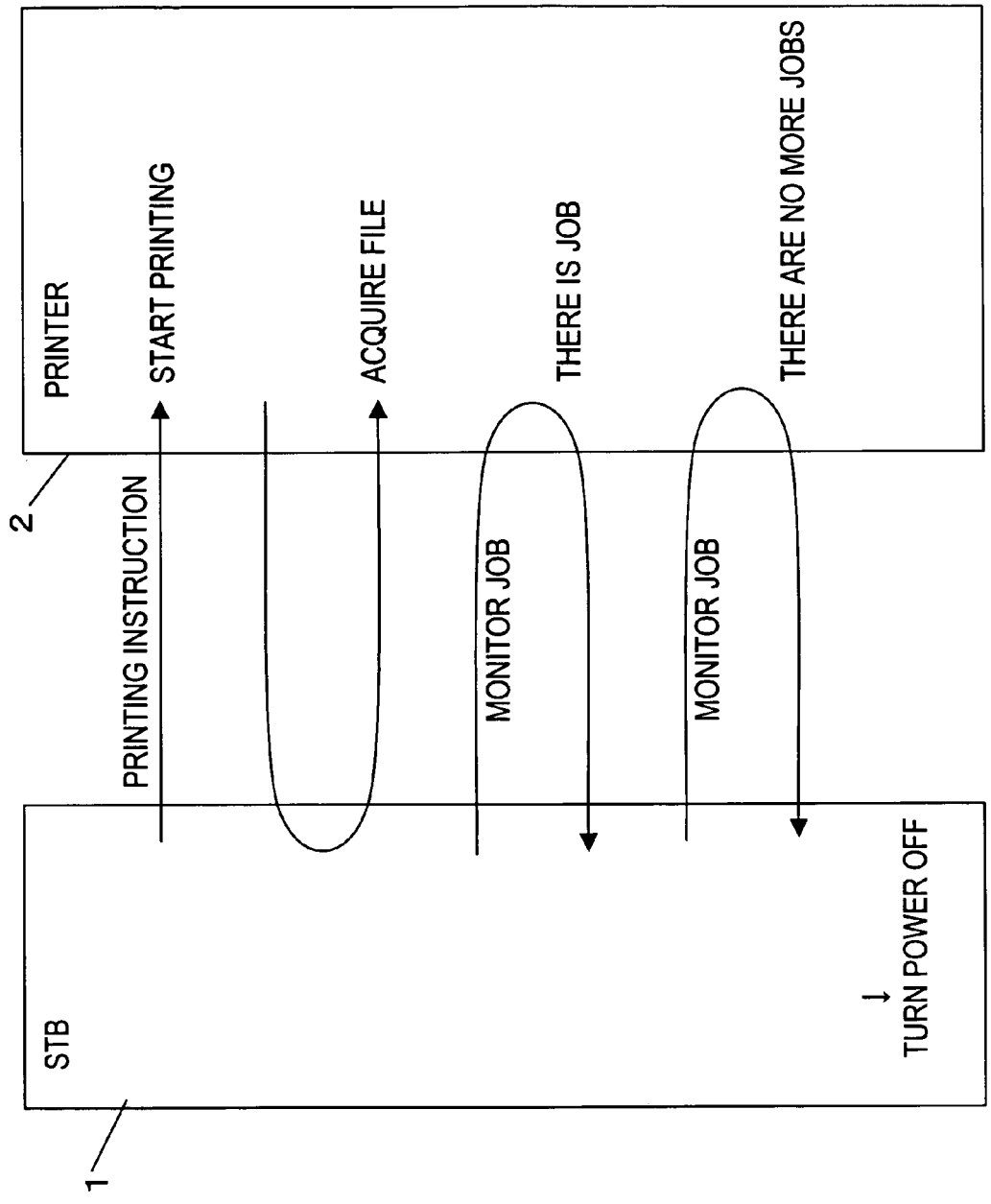
FIG. 6 is a drawing showing the flow of a second process for determining the end of the printing process for the STB 1.

Next, a second method is shown in FIG. 6. As in the first method, when printing the data shown in FIG. 4, the case is considered where 'image1.bml' is already stored in the memory 24 of the printer 2, and 'image1.bml' and 'image2.bml' are stored in the memory 14 of the STB 1. This second method differs from the first method in that the printing JOB information that is managed by the printer 2 is monitored from the STB 1. Management of the printing JOB by the printer 2 is performed by assigning a management number (hereafter called the JOB ID) to each respective printing process, 'image1.bml' and 'image2.bml', as shown in FIG. 7. The JOB ID is assigned every time that a printing instruction is input to the printer 2. For example, when the printing instruction for 'image1.bml' is input, the JOB ID J1 is assigned as the printing process for 'image1.bml, and then when the printing instruction for 'image2.bml' is input, the JOB ID J2 is assigned as the printing process for 'image2.bml'. When the printing JOB of J1 ends, J1 is deleted from the JOB list. Next, the printing process of J2, which is the printing process for image2.bml, is executed by the printer 2. When the printer 2 finishes the printing process of J2, J2 is deleted from the JOB list. On the other hand, the STB 1 periodically monitors the JOB IDs of the printer 2, and at the instant when all of the JOB IDs are deleted from the JOB list, it can be determined that preparation is complete for turning the power OFF. JOB monitoring of the printer 2 from the STB 1 can also be executed after the printer 2 acquires the printing data from the STB 1.

In the method described above, it is possible to determine the end of the power-OFF process for the STB 1, and it is possible to turn the power OFF without the problem of obtaining incomplete printed matter.

It is fundamentally better to determine the end of the printing process by the printer 2 based on whether or not printing is finished for all of the data for which there was a printing instruction. In this case, when there is an instruction to turn OFF the power to the printer 2 and part of the data having a printing instruction is remaining in the STB 1, the power to the STB 1 and printer 2 is turned OFF after printing of all of the data having a printing instruction is finished as described above.

However, it is also possible to determine the end of the printing process by the printer 2 based on whether or not the printing process is finished for the printing jobs or pages of the printing jobs input to the printer 2 before a power-OFF instruction is sent to the printer 2, of the data having a printing instruction. In this case, of the data having a printing instruction, data that remains in the STB 1 when an instruction to turn the power OFF is sent to the printer 2, the waiting job or page, is not printed. When the STB 1 notified in advance that this judgment will be performed by the printer 2, the STB 1 may also turn the power OFF after sending a power-OFF instruction to the printer 2 and as necessary, deleting the spooled data or the like. When the STB 1 is not notified in advance, the printer 2 can notify the STB 1 of that before the power to the printer is turned OFF, and when the STB 1 receives that notification, the STB 1 can turn that power OFF.

Taking into consideration that printing is performed for all of the data for which there was a printing instruction in the former method of determining the end of the printing process by the printer 2, normally the former method of determination is preferred over the latter method, however, since there is a possibility that it is not necessary to print the data remaining in the STB 1, the latter method of determination may also be useful depending on the situation.

That situation may depend on the intentions of the user, so it is possible to have an item as one of the machine setting items of the printer 2 that is set by the user to determine which method of determination to perform, and to have the printer 2 select the method of determination according to that setting.

Furthermore, in order to more smoothly turn OFF the power to the printer 2 with no problems, it is necessary to turn the power OFF at the instant that it is detected that the printing process is completely finished and the printed matter is obtained. As a first method for determining whether or not it is possible to turn OFF the power to the printer 2, a method of adding a paper-output process to the JOB management is possible; as a second method of determination, a method of checking whether the paper-output process has ended for all of the pages known of in advance to be printed is possible; as a third method of determination, a method of ending after a predetermined amount of time following the completion of the printing process is possible; and as a fourth method of determination, a method of having a paper-output-monitoring unit of the printer 2 check whether the paper has been output is possible.

First, with the first determination method, processing from when the printing process ends until the paper-output process is finished is managed by the JOB ID as one JOB, or in other words, both the STB 1 and the printer 2 keep the JOB ID, and by using this shared JOB ID it is possible for the STB 1 to know the state of the printer 2 (information such as what page or what set is currently being printed). When the JOB having this JOB ID ends, it is possible to determine that the printing process has completely finished.

With the second method, it is possible to determine in total how many pages of printing there are from the information of a JOB ID in the stage of the printing process. Therefore, for example, when there is processing for 'image1.bml' and 'image2.bml', there is one page of processing for each as shown in FIG. 7 for a total of two pages of processing, and when it is determined that the paper-output process for the two pages has finished, it is possible to determine that the entire printing process has completely finished. It is possible to determine when the printing process is completely finished by performing determination using the printing pages for just the last JOB without having to perform determination using the printing pages for all JOBs, for example, in FIG. 7, when the process for J1 is in progress, J2 is still remaining, so it is not necessary to determine the end of the process, and when the processing for J2 is in progress, by determining when the paper-output process for the one page ends, it is possible to determine that the printing process has completely finished.

Furthermore, with the third method of determination, whether or not the printing process has ended can be determined by whether or not the printing JOB for 'image1.bml' and 'image2.bml' has been deleted, so after the JOB is deleted, it is possible to determine that the entire printing job has completely finished after a sufficient amount of time for the paper to be output, for example 10 seconds.

With the fourth method of determination, the edge of the paper is detected by the paper-output-monitor unit of the printer 2 shown in FIG. 7, and when the paper is detected that the paper is completely output, it is possible to determine that the printing process has completely finished.

As described in this first embodiment, attention was placed on the printing processes of the STB 1 and the printer 2, and the process for determining when to turn the power OFF is performed based on the end of the respective printing processes of the STB 1 and the printer 2, so the power is not turned OFF when the printing process is in progress. Also, the judgment of when the power is turned OFF is also performed based on the printing process, so it is clear and distinct, and the instruction from the STB 1 to the printer 2 to link the power-OFF process only need to be performed once, and there is no need to design a complex process for linking the power-OFF process. Furthermore, by determining to turn OFF the power to the printer 2 when the paper of the printed matter is completely output, there is no problem of having unprinted matter, and there is no problem of ending before the paper has been output from the printer 2.

In the first embodiment, the case of pull printing was explained, however, in the case of push printing, after the printing data has been completely sent from the STB 1 to the printer 2, there is no process from the printer 2 to the STB 1 for acquiring data, so it is possible to turn OFF the power to the STB 1 right after the reserved shut-down.

Also, by turning the power OFF after a predetermined amount of time following the completion of the printing process, in the case that a new printing process is started after all of the printing processes have ended, it is also possible to end after this new printing process has been performed.

In this first embodiment, by pressing the power button 10 on the STB 1, an instruction to turn OFF the power to the printer 2 is sent from the STB 1 to the printer 2, however, it also possible to send the same instruction by pressing the power button for the STB 1 on the remote control for the STB 1, or it is also possible to link the power-OFF process of the STB 1 and the printer 2 by pressing the power button for the printer 2 on the printer 2 or on the remote control of the printer 2. Furthermore, it is also possible to link the power-OFF process of the STB 1 and the printer 2 by pressing the power button for the STB 1 on the printer 2 or on the remote control of the printer 2. Here, turning the power OFF also includes changing to the energy-saving mode.

(Second Embodiment)

Figure 12:
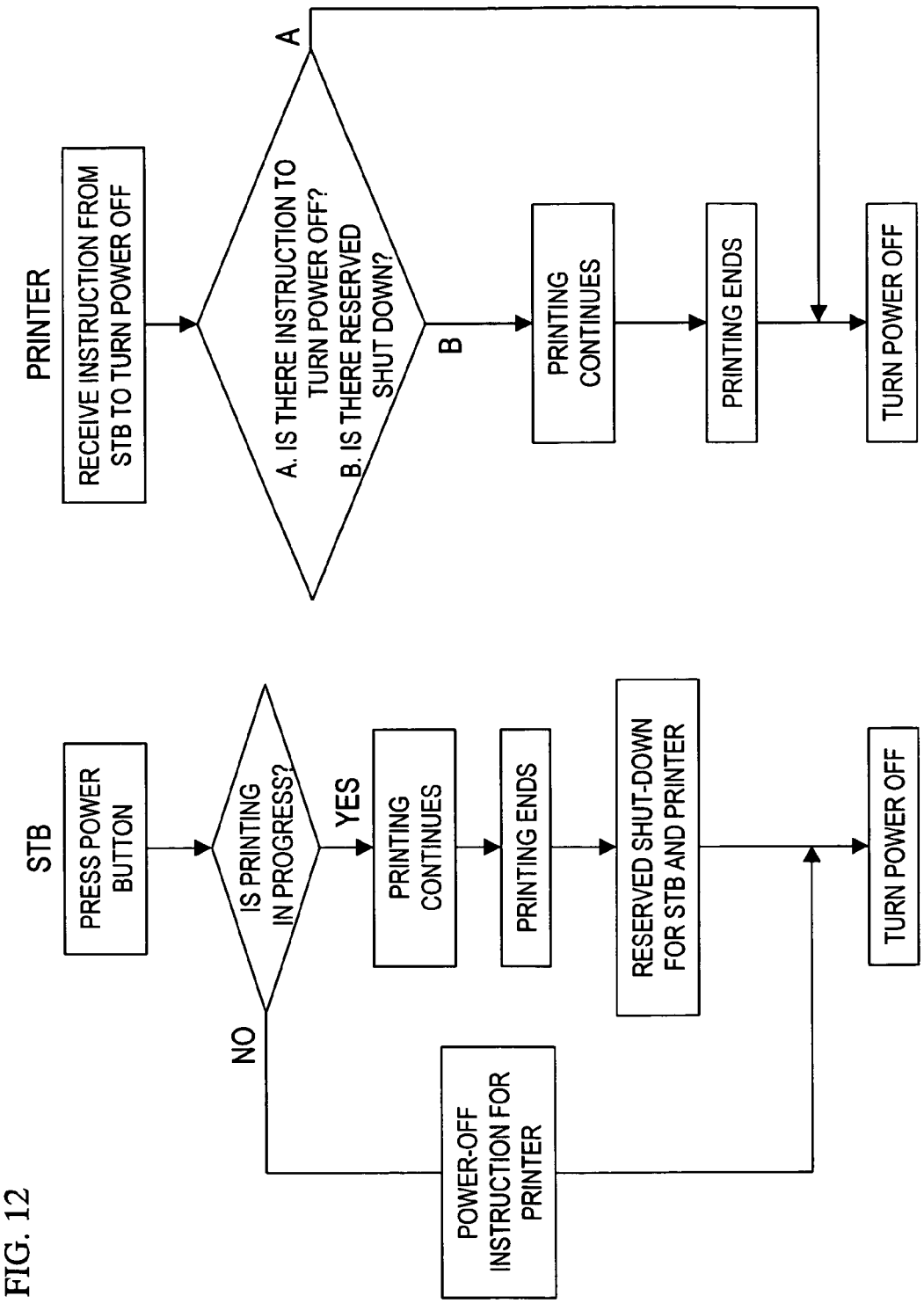
FIG. 12 is a drawing showing the flow of the respective processing of the STB 1 and printer in the second embodiment of the invention.

Next, the case shown in FIG. 3 is described, in which a reserved shutdown instruction is sent to the printer not immediately after the user presses the power button 10 on the STB 1, but after the printing process of the STB 1 ends. The data to be printed is the same as in the first embodiment as shown in FIG. 4. This embodiment differs from the first embodiment in the time of inputting the reserved shutdown instruction from the STB 1 to the printer 2 is different. In this second embodiment, the processing of both the STB 1 and the printer 2 is shown in FIG. 12, and after the power button 10 of the STB 1 is pressed, whether or not the printing process is finished is determined by the STB 1. When the printing process is finished, the power-OFF process is executed. However, when the printing process has not finished, the printing process continues, and after the printing process by the STB 1 finishes, a reserved shutdown instruction for the printer 2 is sent from the STB 1 to the printer 2. After that, the STB 1 executes the power-OFF process.

With the processing of this second embodiment, it is possible to obtain the same effect as in the first embodiment.

Figure 14:
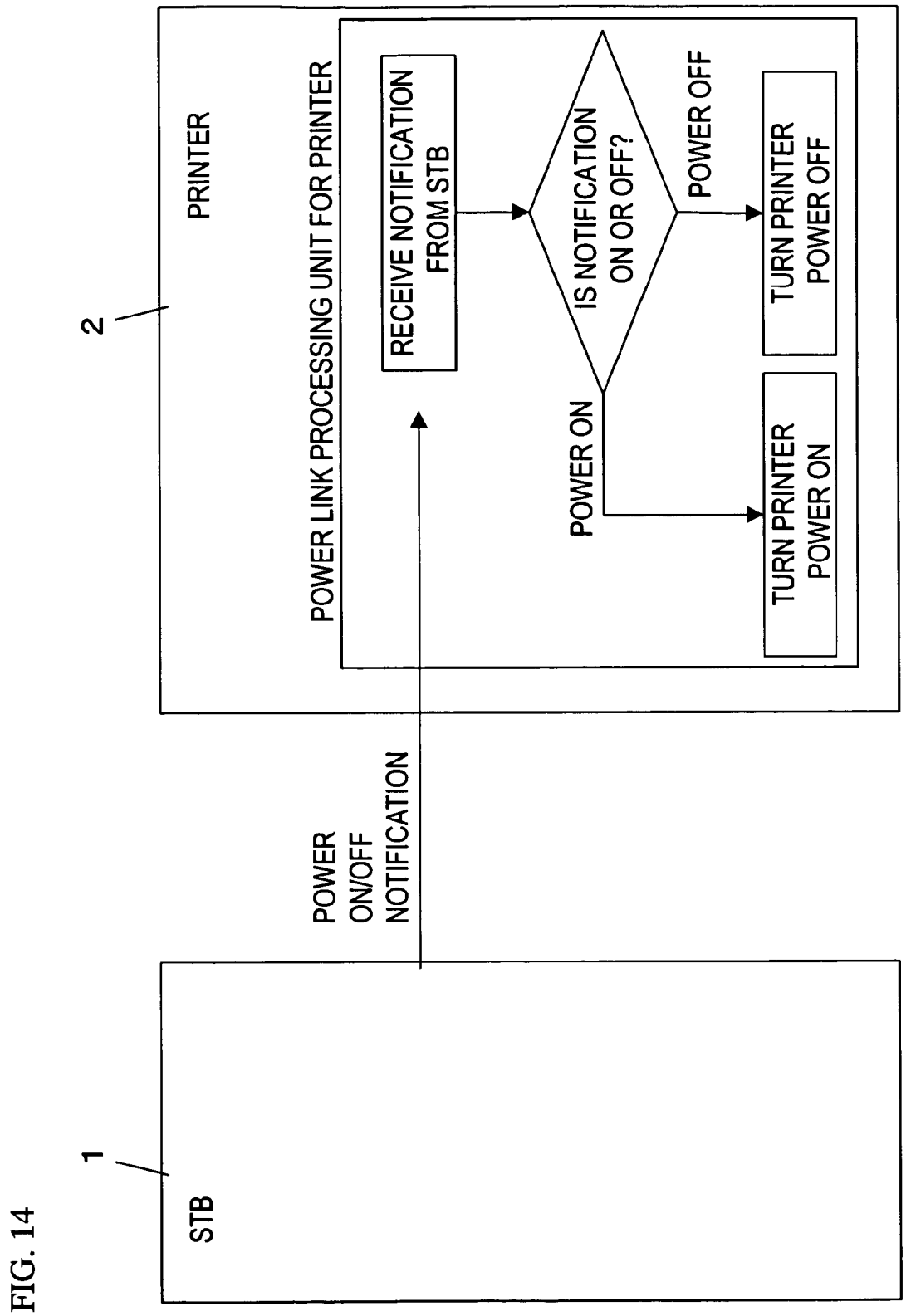
FIG. 14 is a drawing showing the link and the flow of the respective processing of the STB 1 and printer 2 in the second embodiment of the invention.

In the first embodiment, the case in which the power button 10 of the STB 1 is pressed while printing of 'image1.bml' is in progress was described, however, the same process is possible even when the printer 2 is not printing, for example, as shown in FIG. 14, when the power button 10 of the STB 1 is pressed when the printing process in not being performed, an instruction to turn OFF the power to the printer 2 is input from the STB 1 to the printer 2 and it is possible to turn OFF the power to the printer 2. Furthermore, when neither the power to the STB 1 nor the printer 2 is ON, and the power to the STB 1 (or the printer 2) is turned ON, it is possible to link the power that turns the power ON to the printer 2 (or the STB 1).

Moreover, when a reserved shutdown has been sent, by pressing the power button 10 of the STB 1 again, an instruction to cancel the reserved shutdown is sent to the printer 2, and it is possible to cancel the reserved shut-down for the STB 1 as well.

Also, when turning OFF the power to the printer 2, taking into consideration the need to respond to the user's instructions to the printer, it is possible to turn ON the power to just the control section of the printer.

Moreover, in the first and second embodiments, the power link was explained using an example of connecting the printer 2 and the STB 1, however, in the case of connecting a digital television having an internal STB 1 and with a printer 2, the same processing is possible, and the power to the digital television 3 and printer 2 is linked. Also, not only is it possible to connect the printer 2 and the STB 1, but it is also possible to connect so-called smart appliances such as a microwave or refrigerator or other data-output apparatuses to the printer 2. The data-output apparatus outputs data that is stored in memory or is externally obtained to the printer 2, and the printer 2 prints the data. Furthermore, instead of a printer, it is possible to connect other printing apparatuses, such as a facsimile machine or multi-function printer, to a data-output apparatus.

Figure 15:
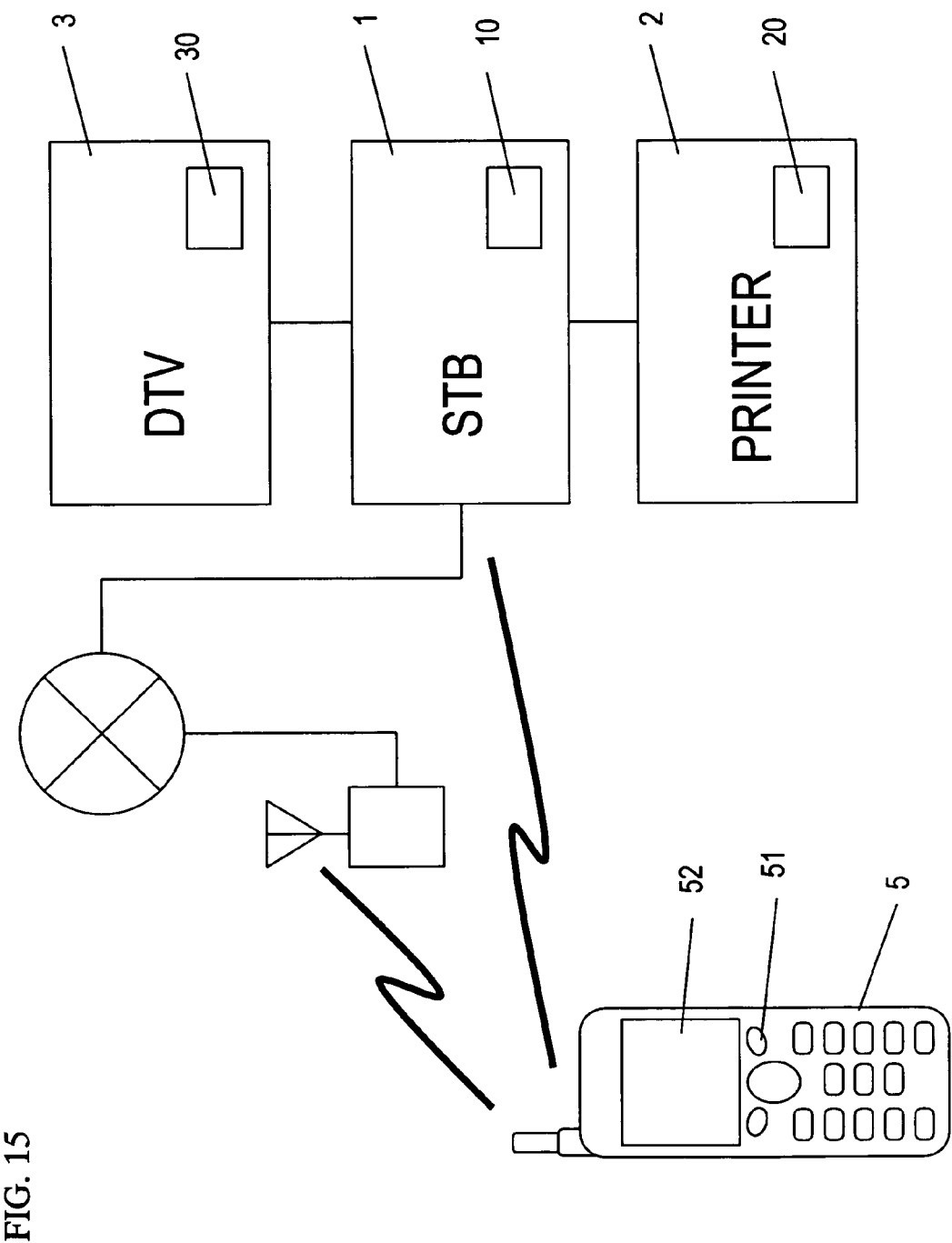
FIG. 15 is a figure showing a printing system that includes a portable telephone.

Furthermore, as shown in FIG. 15, when the STB 1 and a portable telephone 5 are connected by a telecommunications line, instead of using the remote control 11, it is possible to use the portable telephone 5 to operate the STB 1. When the user presses the buttons 51 on the portable telephone 5 to send an instruction to turn the power OFF, the portable telephone 5 sends a request to the STB 1 to turn the power OFF according to the instruction from the user. When the STB 1 receives that request, it sends an instruction to the printer 2 to turn the power OFF. The STB 1 is able to send a notification to the portable telephone 5 between the printing process and the power OFF process. By checking the contents of the notification displayed on the display 52 of the portable telephone 5, the user is able to determine whether or not the power has been turned OFF without having to be next to the STB 1 or printer 2. As has already been explained, when the power is turned OFF after the printing processes of both the data-output apparatus and printing apparatus have been performed, it is possible to include in the notification not only that the power has been turned OFF, but also that the printing process is finished.

Also, the portable telephone 5 differs from the remote control 11 in that its own power is turned OFF. Not only is it possible to link the power-OFF process of the data-output apparatus and the printing apparatus, but it is also possible to link the power-OFF process or transition to the standby state of the portable telephone as well. In this case, after the portable telephone 5 sends a request, its power can be turned OFF right away, or when there is a notification from the STB 1, the portable telephone 5 can wait for that notification and then the power can be turned OFF.

Moreover, when the data-output apparatus has a web client, not only can the communication terminal that performs communication with the data-output apparatus such as a portable telephone 5 or personal-information terminal send the power-OFF request, but can also be used to select web contents to be printed. For example, by using the portable telephone 5, the user is able to select web contents to be printed and a printer to print those contents, and then send an instruction to print the contents. In this case, the portable telephone 5 sends the printing request for the selected web contents to the STB 1. The web client of the STB 1 references the URL address included in the request and acquires the web contents. The printer 2 prints the acquired web contents. In this kind case, when there is a printing request, the STB 1 is restored from the ready state, and after the STB 1 and the printer 2 perform their respective printing processes for that request, it is possible then for the STB 1 to go back to the ready state as described above. In this case, when seen from the portable telephone that sent the printing request, the acquisition of web contents is included in the printing process of the STB 1.

As explained above, if attempting to turn the power OFF to the STB 1 when the printing process by the printer 2 connected to the STB 1 is in progress, it is possible to turn the power OFF to the STB 1 and the printer 2 after the printing process is completed.

What is claimed is:

1. A printing system comprising a printing apparatus and a data-output apparatus that outputs data to be printed to the printing apparatus, wherein
   the data-output apparatus sends an instruction to the printing apparatus to turn the power OFF, and
   the printing apparatus, in response to the instruction from the data-output apparatus, turns OFF the power to the printing apparatus, upon the printing apparatus finishing a printing process for a printing job or a page of the printing job, said printing job being input into the printing apparatus before receiving the instruction from the data-output apparatus.

2. The printing system of claim 1 wherein
   the data-output apparatus is a receiving apparatus that receives data, and
   the printing apparatus prints data received by the receiving apparatus.

3. The printing system of claim 1 wherein
   the data-output apparatus stores data in a memory, and the printing apparatus acquires data from the data-output apparatus.

4. The printing system of claim 3 wherein
   the data-output apparatus sends an instruction to the printing apparatus to turn the power OFF, and after the printing process of the data-output apparatus is finished, turns OFF the power.

5. The printing system of claim 4 wherein
   the printing apparatus sends a notification to the data-output apparatus to delete acquired data from the memory, and
   the data-output apparatus ends the printing process by the data-output apparatus when printing data is deleted from the memory.

6. The printing system of claim 3 wherein
   the data-output apparatus sends an instruction to the printing apparatus to turn the power OFF, when the power to the data-output apparatus is ON, and when the button on the data-output apparatus that controls the power of the data-output apparatus is pressed or when the button of a remote control of the data-output apparatus that controls the power of the data-output apparatus is pressed.

7. The printing system of claim 3 wherein
   the data-output apparatus sends an instruction to the printing apparatus to turn the power OFF, when the power to the data-output apparatus is ON, and when the button on the printing apparatus that controls the power of the data-output apparatus is pressed or when the button of a remote control of the printing apparatus that controls the power of the data-output apparatus is pressed.

8. The printing system of claim 3 wherein
   the data-output apparatus is a STB that receives a digital broadcast.

9. The printing system of claim 3 wherein the data is data of printing contents included in a digital broadcast.

10. The printing system of claim 1 wherein the printing apparatus turns OFF the power after the printing process is finished for the printing job or the page of the printing job, of the data having a printing instruction.

11. The printing system of claim 1 wherein
    the printing apparatus selects (i) or (ii) according to a setting: (i) the printing apparatus turns OFF the power after the printing process is finished for the printing jobs that are input up until the power-OFF instruction is input, or pages of the printing jobs, of the data having a printing instruction, or (ii) when the power-OFF instruction is input and part of the data having a printing instruction remains in the data-output apparatus, the printing apparatus turns OFF the power after the printing process for all of the data having a printing instruction is finished, including the remaining data.

12. The printing system of claim 1 wherein
    the data-output apparatus turns OFF the power to the printing apparatus after the printing process by the data-output apparatus is finished.

13. The printing system of claim 1 wherein
    the printing apparatus sends a notification to the data-output apparatus to delete a file for which the printing process by the printing apparatus has finished, from the memory, and
    the data-output apparatus ends the printing process by the data-output apparatus when data in the progress of being printed is deleted from the memory.

14. The printing system of claim 1 wherein
the data-output apparatus ends the printing process when data in the progress of being printed is deleted from the memory.

15. The printing system of claim 1 wherein
the printing apparatus manages the printing job, and
the data-output apparatus monitors the printing job in the printing apparatus, and when there are no more printing jobs for the printing apparatus, ends the printing process of the data-output apparatus.

16. The printing system of claim 1 wherein
the printing apparatus moves to the 'Ready' state instead turning OFF the power to the printing apparatus.

17. The printing system of claim 1 wherein when the data-output apparatus sends a printing instruction to the printing apparatus,
the printing apparatus turns ON the power to the printing apparatus and starts printing.

18. A method of turning the power OFF in a printing system comprising a printing apparatus and a data-output apparatus that outputs data to be printed to the printing apparatus, the method comprising the steps of:
sending by the data-output apparatus, an instruction to the printing apparatus to turn OFF the power, and
turning OFF, by the printing apparatus, the power to the printing apparatus, in response to the instruction from the data-output apparatus, upon the printing apparatus finishing a printing process for a printing job or a page of the printing job, said printing job being input into the printing apparatus before receiving the instruction from the data-output apparatus.

19. A printing apparatus comprising a receiver that receives data, a printing-process unit, and power-supply unit, wherein in response to the receiver receiving an instruction to turn the power OFF, the printing apparatus turns the power OFF, upon the printing-process unit finishing a printing process for a printing job or a page of the printing job, said printing job being input into the printing apparatus before receiving the instruction from the data-output apparatus.

20. The printing apparatus of claim 19 further comprising a sending unit that sends notifications to a connected device, wherein
the sending unit sends a printing-end notification to the connected device after the printing process by the printing-process unit ends, and executes the power-OFF process for the printing apparatus.

21. The printing apparatus of claim 19 wherein
the printing process by the printing-process unit finishes, and after a predetermined time, the execution of the power-OFF process is performed.

22. The printing apparatus of claim 19 further comprising a paper-output-management unit, and wherein
the execution of the power-OFF process is performed after the paper-output-management unit confirms that paper output has finished.

23. The printing apparatus of claim 19 further comprising a printing-job-management unit, and wherein
the printing-job-management unit manages the paper-output process as a task in one job, and
the execution of the power-OFF process is performed when there are no more printing jobs, which include the paper-output process, in the printing-job-management unit.

24. The printing apparatus of claim 19 further comprising a printing-job-management unit, and wherein
the printing-job-management unit holds information for the number of pages of printing for the printing job, and
the execution of the power-OFF process is performed after printing corresponding to the number of pages held in the printing-job-management unit is completely finished.

25. A data-output apparatus that outputs data to be printed to a printing apparatus, wherein when the user performs an operation to turn OFF the power to the data-output apparatus, the data-output apparatus sends an instruction to turn the power OFF to the printing apparatus, and determines whether or not data is being printed, and turns the power OFF after the printing process ends, and
wherein the printing apparatus, in response to the instruction from the data-output apparatus, turns OFF the power to the printing apparatus upon the printing apparatus finishing a printing process for a printing job or a page of the printing job, said printing job being input into the printing apparatus before receiving the instruction from the data-output apparatus.

26. The data-output apparatus of claim 25 comprising a memory, and that ends the printing process when there is no more data to be printed in the memory.

* * * * *